(12) United States Patent
Bohaychuk

(10) Patent No.: US 6,536,473 B2
(45) Date of Patent: Mar. 25, 2003

(54) CHOKE VALVE

(75) Inventor: Larry J. Bohaychuk, Mundare (CA)

(73) Assignee: Master Flo Valve Inc., Edmonton (CA)

( * ) Notice: Subject to any disclaimer, the term of this patent is extended or adjusted under 35 U.S.C. 154(b) by 68 days.

(21) Appl. No.: 09/920,706

(22) Filed: Aug. 2, 2001

(65) Prior Publication Data

US 2003/0024580 A1 Feb. 6, 2003

(51) Int. Cl.[7] .............................................. F16K 11/04
(52) U.S. Cl. ................................. 137/625.37; 251/118
(58) Field of Search ........................ 137/625.3, 625.33, 137/625.37; 251/118

(56) References Cited

U.S. PATENT DOCUMENTS

| | | | | |
|---|---|---|---|---|
| 3,479,004 A | * | 11/1969 | Brumm | 251/118 |
| 3,780,767 A | * | 12/1973 | Borg et al. | 137/625.3 |
| 4,281,678 A | * | 8/1981 | Claycomb | 137/238 |
| 4,461,316 A | * | 7/1984 | Cove et al. | 137/312 |
| 4,705,071 A | * | 11/1987 | Connors, Jr. et al. | 137/625.3 |
| 4,874,007 A | * | 10/1989 | Taylor | 137/312 |
| 5,018,703 A | * | 5/1991 | Goode | 251/127 |
| 5,020,568 A | * | 6/1991 | Taylor | 137/316 |
| 5,054,521 A | * | 10/1991 | Hendrick | 137/625.31 |
| 5,090,450 A | * | 2/1992 | Pelech et al. | 137/625.3 |
| 5,365,978 A | * | 11/1994 | Woods | 137/614.11 |
| 5,431,188 A | * | 7/1995 | Cove | 137/625.3 |
| 5,706,856 A | * | 1/1998 | Lancaster | 137/556.3 |
| 6,105,614 A | | 8/2000 | Bohaychuk et al. | 137/625.3 |

* cited by examiner

*Primary Examiner*—John Fox
(74) *Attorney, Agent, or Firm*—Marsh Fischmann & Breyfogle LLP

(57) ABSTRACT

The downstream end of the flow trim cage is formed to provide an inwardly protruding lip. The lip deflects flow inwardly as it leaves the bore of the cage. As a result, erosion of the body, immediately downstream of the flow trim, is reduced.

9 Claims, 3 Drawing Sheets

CHOKE VALVE

FIELD OF THE INVENTION

The present invention relates to a choke valve for controlling pressurized fluid flow through a line, such as the flow produced by an oil or gas well. More particularly the invention relates to modifying the outlet of the valve and its flow trim cage to thereby reduce erosion of the valve body immediately downstream of the cage.

BACKGROUND OF THE INVENTION

A choke valve (hereinafter referred to as a 'choke') is a throttling device. It is used to control flow rate while reducing the fluid pressure of a stream moving through a flow line. Chokes are commonly used in oil or gas drilling and production systems to provide throttling and shut-off with respect to high pressure streams.

The present invention was developed in connection with seeking to ameliorate the erosive effect of such streams when carrying abrasive solid particles, such as entrained sand.

A choke, previously developed by the assignee of this application, is disclosed in U.S. Pat. No. 6,105,614. This choke is illustrated in FIG. 1 of this specification. In general, the choke comprises:
- a valve body a having a T-shaped bore structure consisting of an inlet bore b, an outlet bore c and a component bore d;
- the choke internals are positioned in the component bore d, which communicates with the inlet and outlet bores b, c. The internals comprise a flow trim e, having a tubular cylindrical cage f, whose side wall g forms ports h, and a tubular cylindrical sleeve i for sliding along the cage f, together with means j for advancing or retracting the sleeve and suitable sealing means k.

In the operation of the choke, the flow stream moves through an L-shaped passageway formed by the body inlet bore b, the cage ports h, the cage bore 1, and the body outlet bore c. The sleeve i functions to throttle flow by adjusting the area of the ports h.

It will be noted that the valve body outlet bore c has a reduced diameter section m, an expanding diameter transition section n and a full diameter section o which corresponds with the internal diameter of the downstream flow line (not shown).

In the course of passing through the choke, the velocity of the stream increases. This occurs because the passageway cross-sectional areas in the choke are smaller than the bore cross-sectional area of the flow lines upstream and downstream of the choke. This acceleration exacerbates erosive effects on the choke.

The valve body of the choke typically is made of relatively softer steel, to permit the body to be machined. In contrast, the flow trim is made of harder material, to better resist erosion as the stream makes a right angle turn through the flow trim.

Our inspection of used chokes has shown that severe erosion of the valve body commonly occurs along the reduced diameter section m of the valve outlet bore c, immediately downstream of the cage f.

It is the objective of the present invention to improve the choke's ability to withstand erosion downstream of the flow trim.

SUMMARY OF THE INVENTION

As a result of experimental work involving test runs of pressurized fluid through a choke, we have discovered:

that provision of an annular, inwardly protruding lip at the outlet of the cage bore will deflect the fluid flow inwardly so as to reduce erosion of the valve body along the reduced diameter section of the outlet bore; and that preferred conditions in this connection are:
(1) that the lip should protrude inwardly less than about 0.060 inches relative to the surface of the valve body outlet bore reduced diameter section;
(2) that the transition section of the valve body outlet bore should be spaced at least 0.5 inches and less than 1.125 inches from the cage bore outlet;
(3) that the lip should be formed as an inclined ramp having an inclination of about 10°; and
(4) the transition angle between the reduced diameter section of the outlet bore and the full diameter section should be in the range of 25°–35°. [To match the fluid re-entry angle thereby reducing erosion to the transition area between bore m and bore o.]

If any of these limitations are not met, then there is a tendency to create eddy currents at the valve body surface of the reduced diameter section of the outlet bore, with some consequent erosion.

Broadly stated, the invention is directed to a choke valve for controlling pressurized fluid flow in a line, comprising: a valve body forming an inlet bore, a component bore and an outlet bore; each bore having an inlet and an outlet; the component bore connecting the outlet of the inlet bore and the inlet of the outlet bore; a flow trim positioned in the component bore for controlling flow through the bores, said flow trim comprising a tubular cage having upstream and downstream ends, said cage having a side wall with an inner surface forming a longitudinal bore, said cage side wall forming flow ports extending therethrough at its upstream end, and a tubular sleeve operative to slide along the cage to throttle the ports; means, extending into the component bore, for biasing the sleeve along the cage; means for sealing the flow trim and biasing means within the component bore; the cage being formed of harder material than the body; the cage side wall forming an inwardly protruding lip at the downstream end of the cage bore for deflecting fluid passing through the valve toward the center of the valve body outlet bore to thereby reduce erosion of the valve body immediately downstream of the cage.

DESCRIPTION OF THE PREFERRED EMBODIMENT

Figure 1:
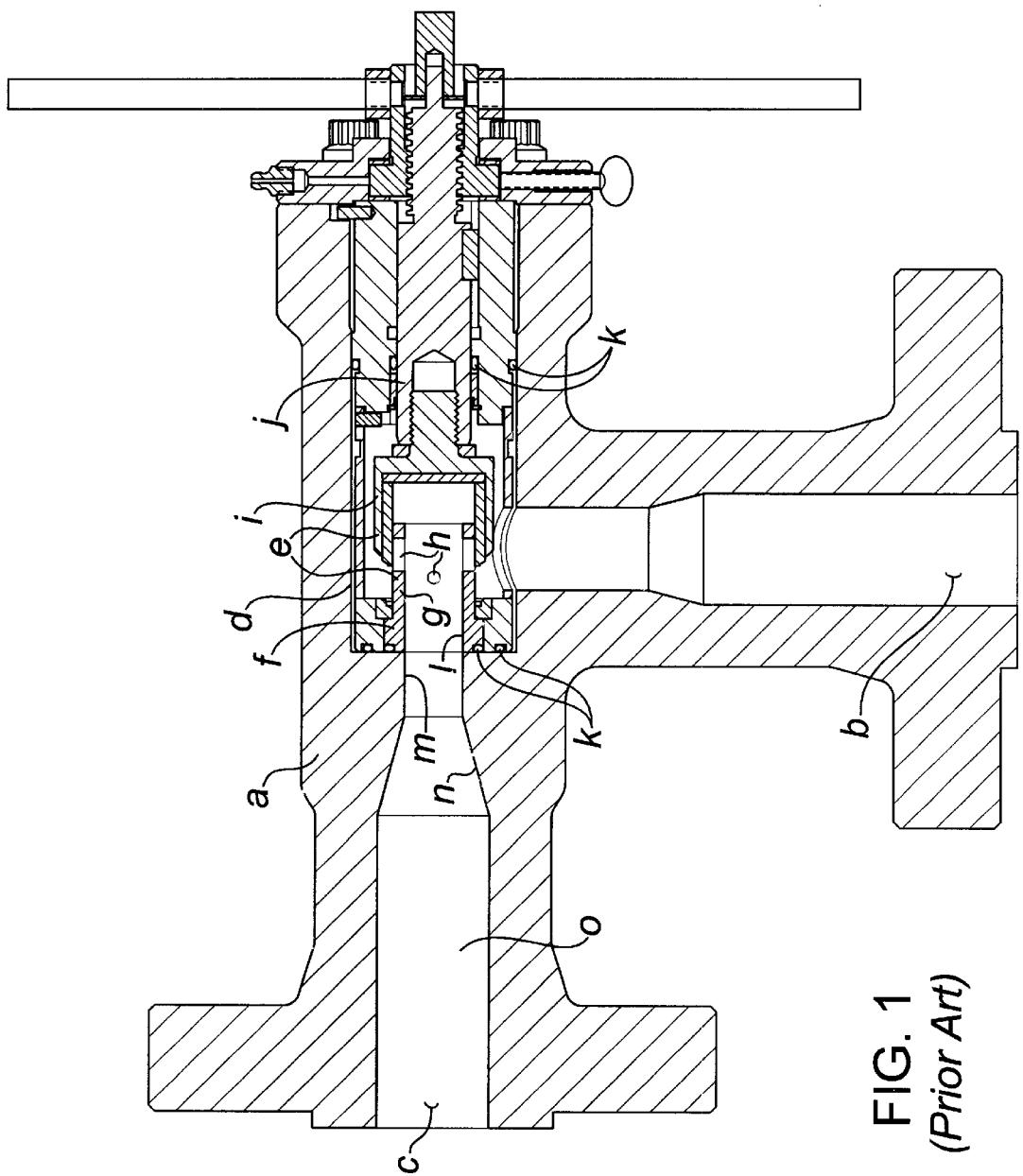
FIG. 1 is a cross-sectional side view of a choke valve in accordance with the prior art.
Figure 2:
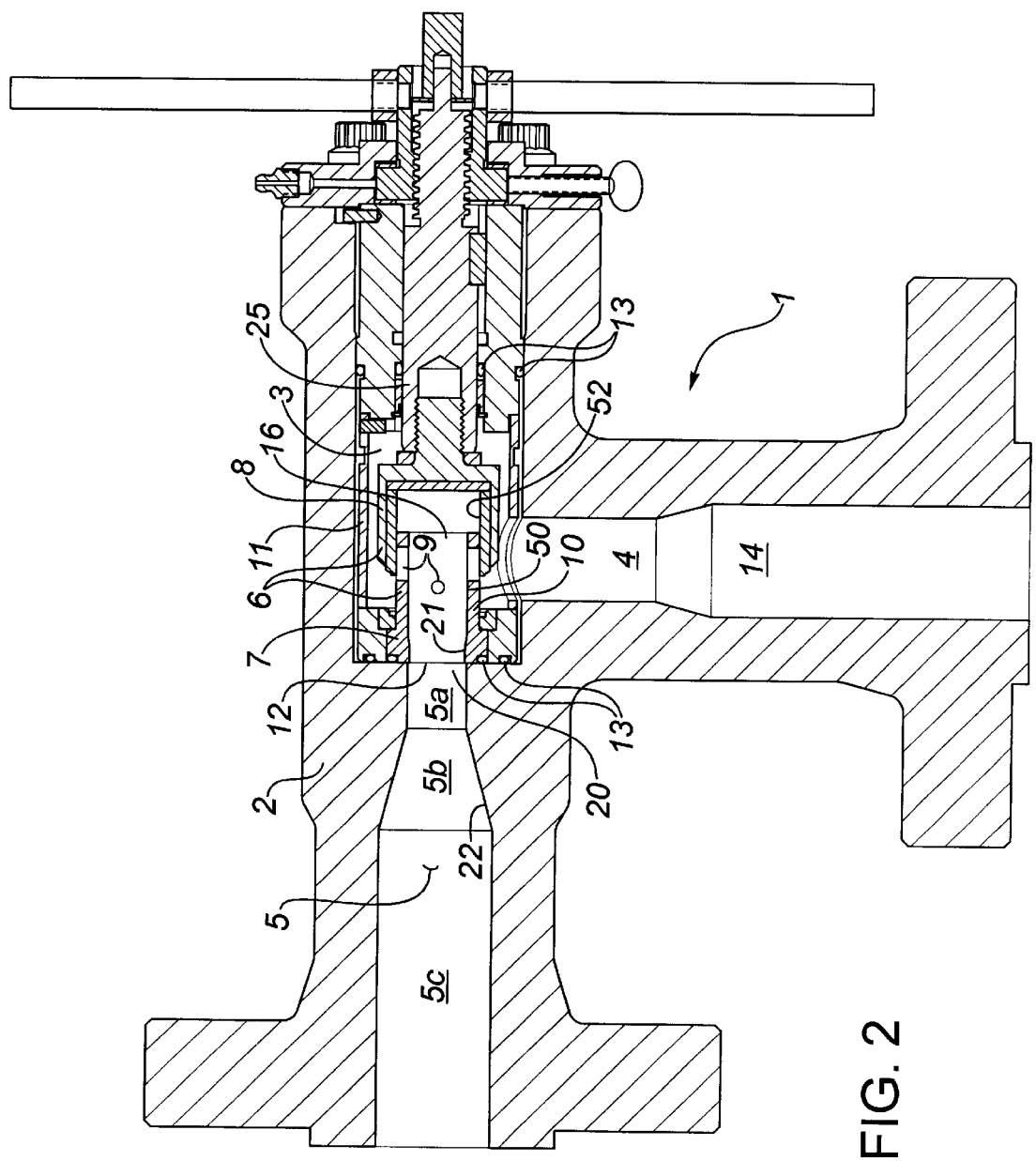
FIG. 2 is a view similar to FIG. 1, with the flow trim cage and body modified in accordance with the invention.

Having reference to FIG. 2, the choke 1 comprises a body 2 forming a component bore 3, inlet bore 4 and outlet bore 5. The outlet bore has a reduced diameter section 5a, a transition section 5b and a full diameter section 5c. The flow trim 6, comprising a cage 7 and sleeve 8, is positioned in the component bore 3 in transverse position relative to the inlet bore 4 and in alignment with the outlet bore 5. The cage 7 is tubular in configuration, has flow ports 9 extending through its side wall 10 at its upstream end and forms a longitudinal bore 16. The downstream end of the cage 7 is contiguous to the reduced diameter section 5a of the outlet bore 5. The cage bore 16 terminates in an outlet 12 at its downstream end. The outlet 12 communicates with the inlet 20 of the body outlet bore 5. The sleeve 8 is positioned and is operative to slide over and along the cage 7 to throttle the ports 9. A stem assembly 25 provides means for biasing the sleeve 8 along the cage 7. Seals 13 provide means for sealing the flow trim 6 and stem assembly 25 to the valve body 2 to prevent leakage.

The flow trim 6 is formed of materials with higher hardness than the body 2, which is formed of carbon or stainless steel. Typically the flow trim 6 is formed of tungsten carbide.

At its downstream end, the cage side wall 10 forms an internal annular inward protruding or lip 21 in the form of a ramp.

Figure 3A:
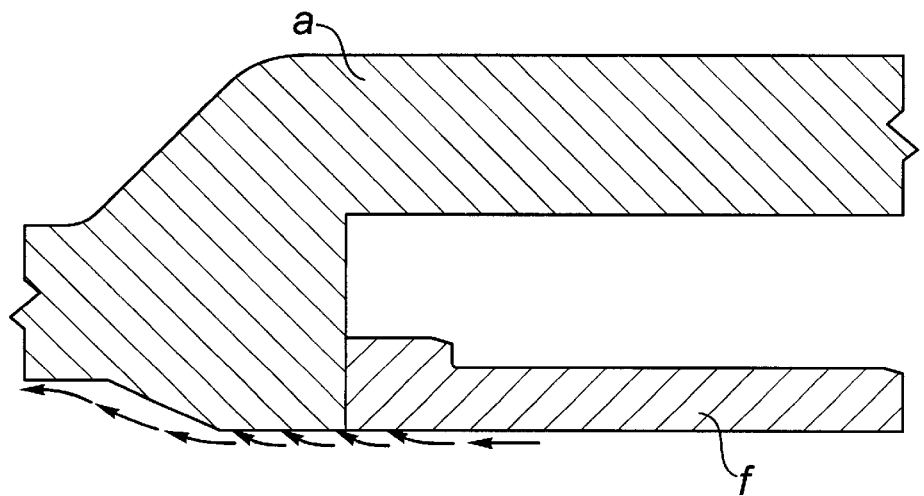
FIG. 3a is a simplified side view of part of the cage and body in accordance with the prior art, with arrows suggesting the path of deflected fluid.
Figure 3B:
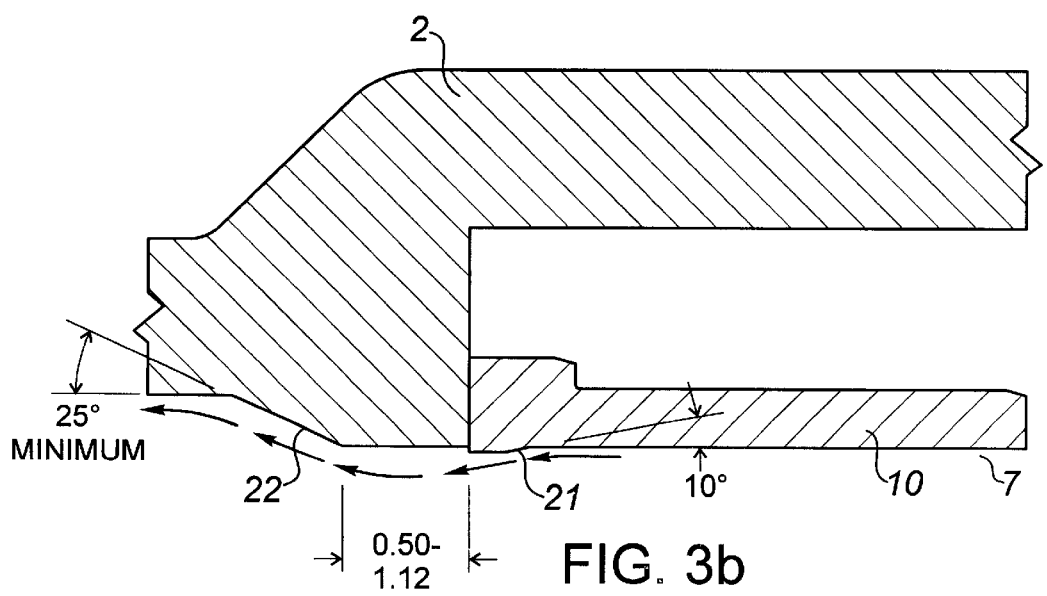
FIG. 3b is a simplified side view of part of the cage and body in accordance with the invention, with arrows suggesting the path of deflected fluid and preferred dimensions marked thereon.

The lip 21 protrudes inwardly less than 0.060 inches and has an angularity of about 10°. The transition section 22 of the outlet bore 5 is spaced downstream of the cage 7 at a distance between 0.5 and 1.125 inches. The transition angle is between 25°–35°. The dimensions of our best mode are shown on FIG. 3b.

The claims now following set forth the scope of the invention.

The embodiments of the invention in which an exclusive property or privilege is claimed are defined as follows:

1. A choke valve for controlling pressurized fluid flow in a line, comprising:

a valve body forming an inlet bore, a component bore and an outlet bore;

each bore having an inlet and an outlet;

the component bore connecting the outlet of the inlet bore and the inlet of the outlet bore;

a flow trim positioned in the component bore for controlling flow through the bores, said flow trim comprising a tubular cage having upstream and downstream ends, said cage having a side wall with an inner surface forming a longitudinal bore, said cage side wall forming flow ports extending therethrough at its upstream end, and a tubular sleeve operative to slide along the cage to throttle the ports;

means, extending into the component bore, for biasing the sleeve along the cage;

means for sealing the flow trim and biasing means within the component bore;

the cage being formed of harder material than the body;

the cage side wall forming an inwardly protruding lip at the downstream end of the cage bore for deflecting fluid passing through the valve toward the center of the valve body outlet bore to thereby reduce erosion of the valve body immediately downstream of the cage.

2. The choke valve as set forth in claim 1 wherein:

the outlet bore has a reduced diameter section, contiguous to the downstream end of the cage, a transition section and a full diameter section; and the lip protrudes inwardly less than 0.06 inches relative to the cage side wall inner surface forming the reduced diameter section.

3. The choke valve as set forth in claim 2 wherein:

the transition section is spaced downstream of the cage at a distance between 0.5 and 1.125 inches.

4. The choke valve as set forth in claim 3 wherein:

the lip is a ramp having an angularity of about 10°.

5. The choke valve as set forth in claim 4 wherein:

the transition section has an angularity in the the range 25°–35°.

6. The choke valve as set forth in claim 2 wherein:

the transition section has an angularity in the the range 25°–35°.

7. The choke valve as set forth in claim 1 wherein:

the outlet bore has a reduced diameter section, contiguous to the downstream end of the cage, a transition section and a full diameter section; and the transition section is spaced downstream of the cage at a distance between 0.5 and 1.125 inches.

8. The choke valve as set forth in claim 3 wherein:

the transition section has an angularity in the the range 25°–35°.

9. The choke valve as set forth in claim 1 wherein:

the lip is a ramp having an angularity of about 10°.

* * * * *